Patented Sept. 18, 1945

2,385,290

UNITED STATES PATENT OFFICE 2,385,290

PLASTICIZED BUTADIENE-ACRYLONITRILE COPOLYMER

Joy G. Lichty, Stow, Ohio, assignor to Wingfoot Corporation, Akron, Ohio, a corporation of Delaware No Drawing. Application November 12, 1943, Serial No. 510,036

2 Claims. (Cl. 260—36)

This invention relates to a plasticized, rubber-like copolymer composition composed essentially of a copolymer of butadiene and acrylonitrile. The plasticizer is a trichloro propionate.

The following example is illustrative of the invention although, of course, the compounding formula may be varied, and the amount of plasticizer employed may, likewise, be varied. The tensile and modulus values below are given in kilograms per square centimeter, which may be converted to pounds per square inch by multiplying these values by the conversion factor 14.2.

Example

| | |
|---|---|
| Copolymer | 110.0 |
| Zinc oxide | 5.0 |
| Sulfur | 2.0 |
| Gas black | 60.0 |
| Drillax (benzothiazyl-2-diethyl sulphenamide) | 1.0 |
| Stearic acid | 1.0 |
| Isobutyl trichloro propionate | 40.0 |

| Cure | Tensile | Elongation | Modulus—300% |
|---|---|---|---|
| 20 min./290° C | 166 | 370 | 123 |
| 40 min./290° C | 152 | 270 | |
| 60 min./290° C | 138 | 225 | |

Other trichloropropionates which may be similarly employed are:

Amyl trichloro propionate
Cyclohexyl trichloro propionate
Furfuryl trichloro propionate
Tetrahydrofurfuryl trichloro propionate
Ethylene bis trichloro propionate
Methoxy ethyl trichloro propionate
Butoxy ethyl trichloro propionate
Benzyl trichloro propionate
Phenyl trichloro propionate The use of easily hydrolyzable compounds, such as the phenyl trichloro propionate, will be avoided in the presence of moisture.

What I claim is:

1. A rubber-like composition composed essentially of a copolymer of butadiene and acrylonitrile plasticized with isobutyl trichloro propionate.

2. A rubber-like composition composed essentially of a copolymer of butadiene and acrylonitrile plasticized with an ester of trichloro propionic acid, the ester-forming group being a hydrocarbon radical.

JOY G. LICHTY.